July 15, 1947. F. A. DEUTSCH 2,424,022
APPARATUS FOR THE EXTRACTION OF THE KERNEL OR KERNELS FROM A NUT
Filed Oct. 12, 1945 4 Sheets-Sheet 1
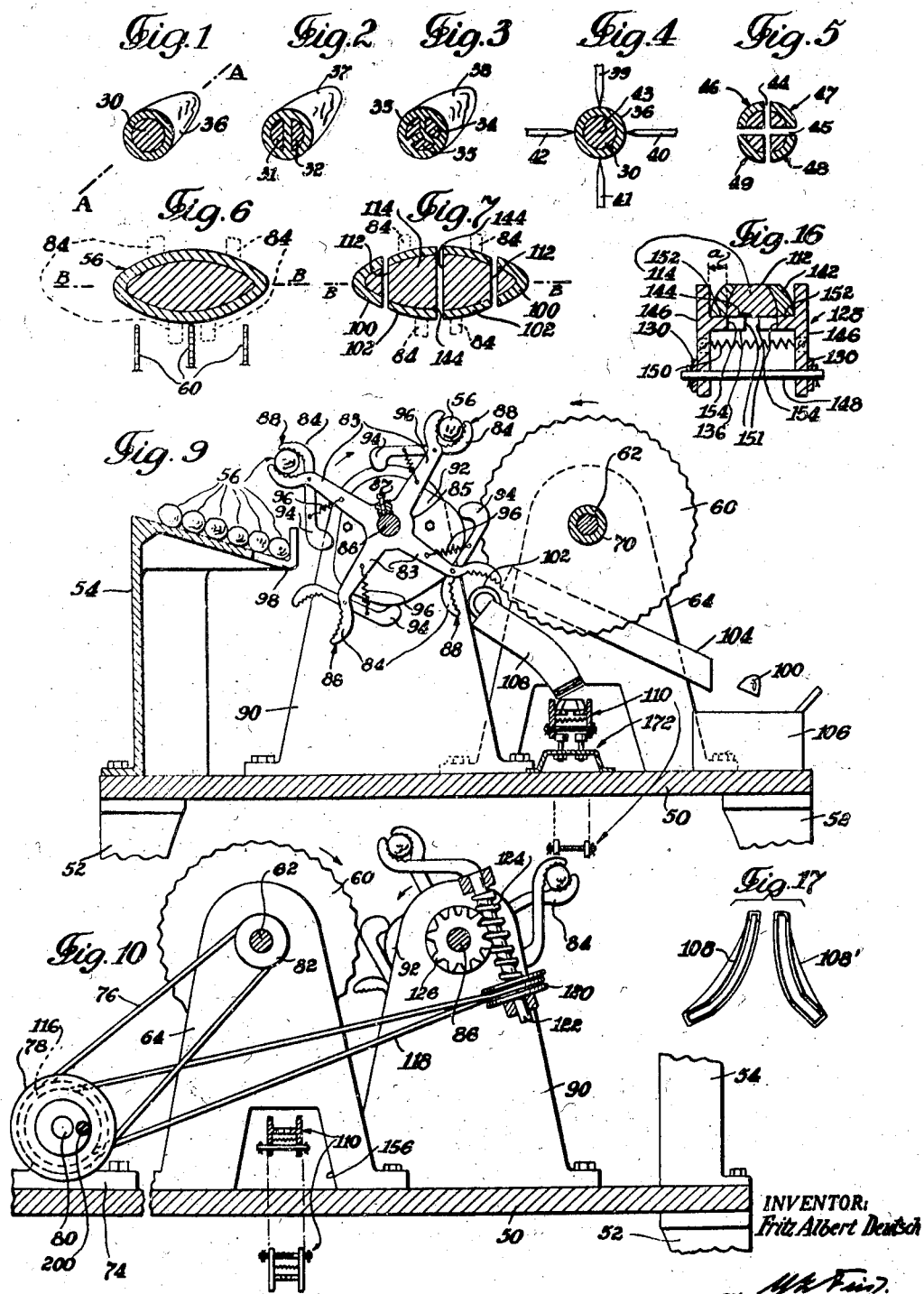

July 15, 1947. F. A. DEUTSCH 2,424,022
APPARATUS FOR THE EXTRACTION OF THE KERNEL OR KERNELS FROM A NUT
Filed Oct. 12, 1945 4 Sheets-Sheet 2

INVENTOR:
Fritz Albert Deutsch
BY
his ATTORNEY.

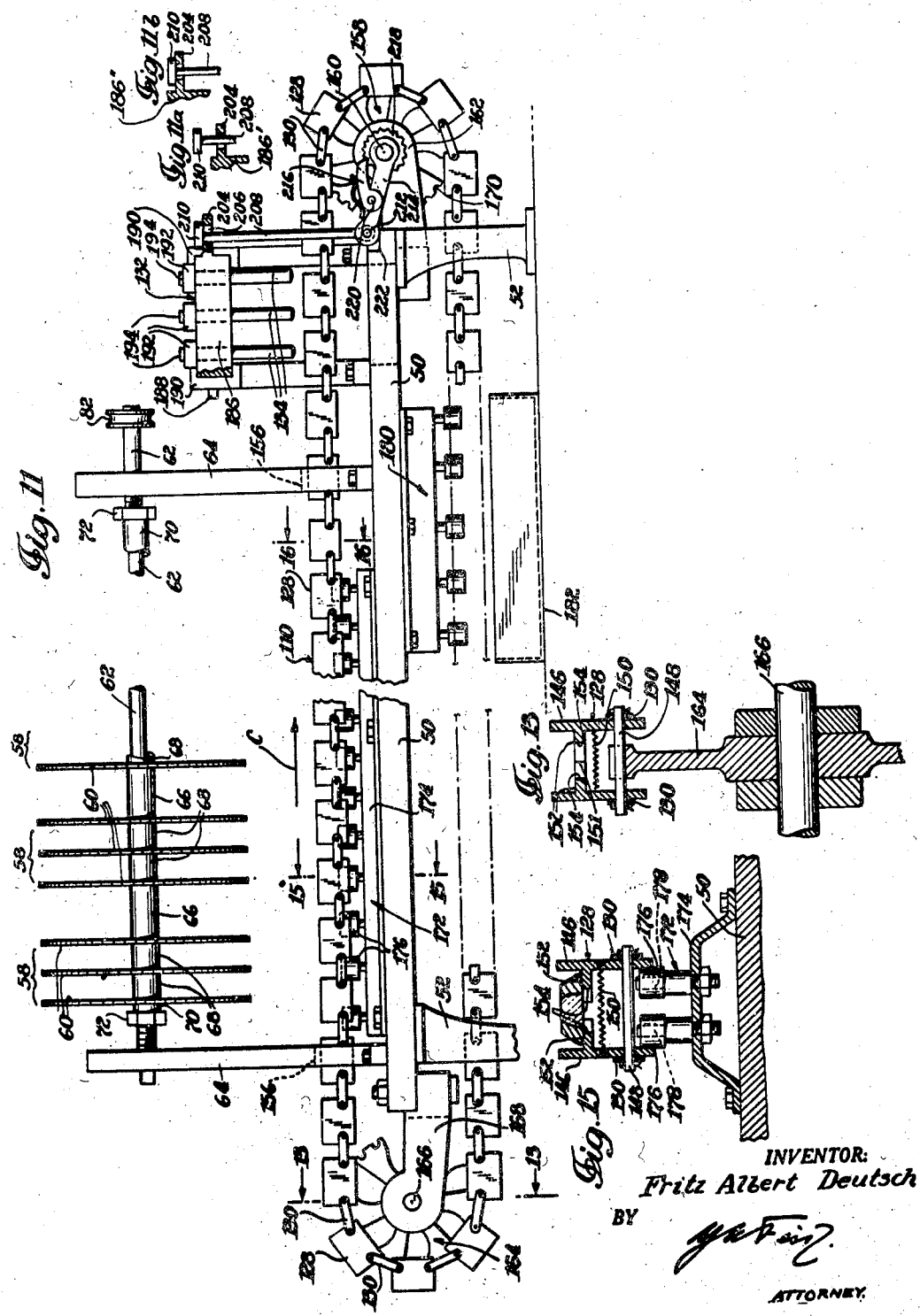

July 15, 1947.    F. A. DEUTSCH    2,424,022
APPARATUS FOR THE EXTRACTION OF THE KERNEL OR KERNELS FROM A NUT
Filed Oct. 12, 1945    4 Sheets-Sheet 4

INVENTOR:
Fritz Albert Deutsch
BY
his ATTORNEY.

Patented July 15, 1947

2,424,022

UNITED STATES PATENT OFFICE 2,424,022

APPARATUS FOR THE EXTRACTION OF THE KERNEL OR KERNELS FROM A NUT

Fritz Albert Deutsch, Caracas, Venezuela

Application October 12, 1945, Serial No. 621,919½

23 Claims. (Cl. 146—10)

1

My invention relates to an apparatus for the extraction of the kernel or kernels from a nut.

The kernel or kernels of many kinds of palm nuts, such as the Attalea nut, the corozo nut, the babassu nut, the macanilla nut, etc., contain a valuable oil, which may be extracted from the kernels, after the nuts have been opened and the kernels have been disengaged from the shell of the nuts. According to the perspective views of Figs. 1–3, palm nuts of above described kind may contain one kernel 30, or two kernels 31 and 32, or three kernels 33, 34 and 35, which are hermetically enclosed in a rather hard shell 36, 37 or 38 respectively. If such a nut is opened by a cracking device, the kernel or kernels are more or less mutilated, as, owing to the lack of any space between the kernel or kernels and the shell, portions of the shell are pressed into the substance of the kernel or kernels during the cracking operation. A mutilation of the kernels, however, reduces the output in oil.

There are machines on the market for a mechanical opening of the palm nuts by means of knives or the like splitting the nuts by cuts extending in the direction of the longitudinal axis of the nut. Figs. 4 and 5 diagrammatically illustrate the operation of such a nut-opening machine. For example, during the operation of such a nut-opening machine, the four knives 39, 40, 41 and 42 are moved toward the center 43 of the nut supplied to the machine, whereby the nut is split by cuts 44 and 45 (see Fig. 5) extending in the direction of the longitudinal axis A—A (see Fig. 1) of the nut, so that the four sections 46, 47, 48 and 49 (see Fig. 5) are formed. Although the nut-opening machines of this type eliminate the cracking of the shell 36 and a mutilation or destruction of the kernel 30 by portions of the cracked shell penetrating into the substance of the kernel during the cracking operation, these machines do not provide for an automatic mechanical separation of the kernel from the shell. Therefore, the output in kernels extracted from the nuts is rather small, as, after the mechanical opening of the nuts, the kernel portions must be manually disengaged from the shell portions in a difficult and time consuming manner. Furthermore, the hitherto known nut-opening machines of above described type require a previous assortment of the nuts according to their diameter, and the lengthwise splitting of the nuts is impractical when the nuts contain two or more kernels as shown in Figs. 2 and 3.

An object of my invention is to provide an apparatus for the extraction of the kernel or kernels from a nut, by means of which both the opening of the nut and the separation of the kernel from the shell are mechanically performed.

A further object of my invention is to provide an apparatus for the mechanical extraction of the kernel or kernels from a nut, which does not require a previous assortment of the nuts according to their size.

Still another object of my invention is to provide an extracting apparatus of above described type having a great output in kernels extracted from the nuts.

The above mentioned objects and advantages as well as other objects and advantages will be more fully disclosed in the following specification reference being had to the accompanying drawings forming part of this specification, wherein:

Fig. 1 illustrates a perspective sectional view of a nut having one kernel,

Fig. 2 illustrates a perspective sectional view of a nut having two kernels,

Fig. 3 illustrates a perspective sectional view of a nut having three kernels,

Figure 8:
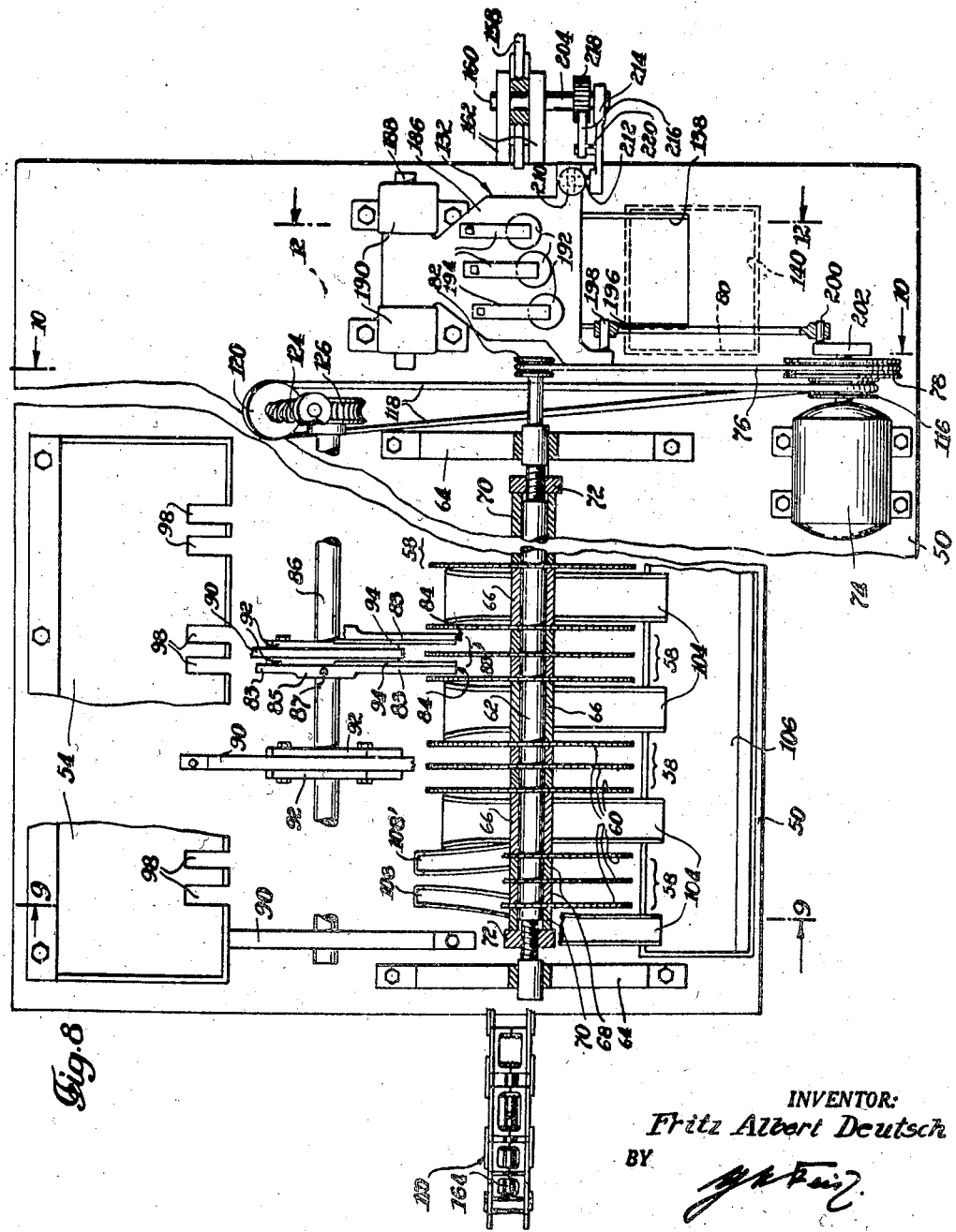
Figure 12:
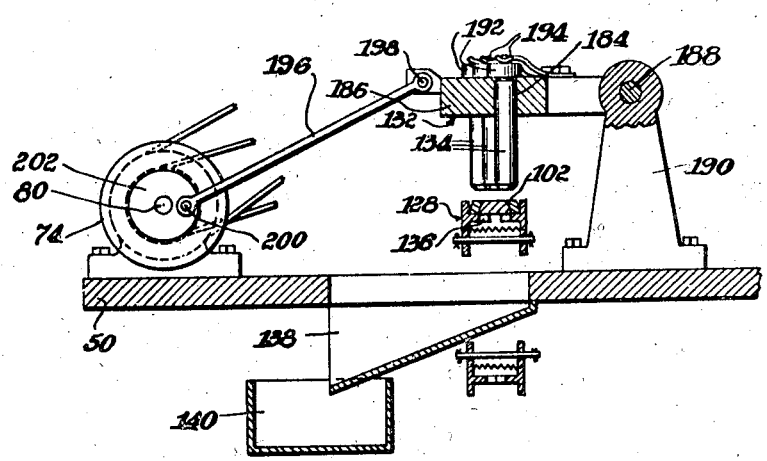
Figure 14:
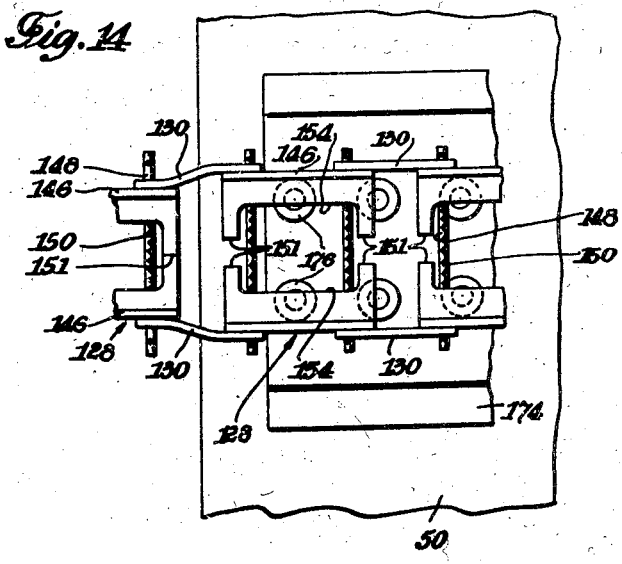

Fig. 4 diagrammatically illustrates the lengthwise splitting of a nut by means of the hitherto known machines, Fig. 5 illustrates a cross sectional view of a nut divided into four sections by the knives of a hitherto known machine, Fig. 6 illustrates a longitudinal sectional view of a nut and a portion of the circular saws used for cutting the nut in the apparatus according to my invention, Fig. 7 illustrates a longitudinal sectional view of a nut divided into four slices by the circular saws of the apparatus according to the invention, Fig. 8 is a top plan view of the apparatus according to the invention, partly in section, some parts being omitted and some parts being broken away for the sake of better illustration, Fig. 9 is a sectional view of the apparatus taken on line 9—9 of Fig. 8, some parts being omitted and some parts being broken away for the purpose of better illustration, Fig. 10 is a sectional view of the apparatus taken on line 10—10 of Fig. 8, some parts being omitted and some parts being broken away for the sake of better illustration, Fig. 11 is a side elevational view of the apparatus according to the invention, some parts being omitted and some parts being broken away for the sake of better illustration, Figs. 11a and 11b are fragmentary sectional views of a portion of the kernel expeller and a controlling rod for the drive of the conveyor carrying the slices of the nuts as illustrated by Fig. 11, said elements being shown in different positions, Fig. 12 is a fragmentary sectional view of the apparatus taken on line 12—12 of Fig. 8, Fig. 13 is a fragmentary sectional view of the conveyor and a portion of the idling wheel engaged with the conveyor, taken on line 13—13 of Fig. 11, Fig. 14 is a fragmentary top plan view of the conveyor, Fig. 15 is a sectional view of the conveyor and the means for the opening of the clamping elements on the carriages of the conveyor, taken on line 15—15 of Fig. 11, Fig. 16 is a sectional view of the conveyor taken on line 16—16 of Fig. 11, and Fig. 17 is an elevational view of the positioning chutes associated with each group of circular saws for placing the two center slices of the nuts cut by the circular saws in a proper position onto the conveyor.

Referring now to Figs. 8–11, 50 indicates the base of the apparatus carried by the supports 52. A supply table 54 mounted on said base 50 serves to receive the nuts 56, the kernels of which are to be extracted by the apparatus.

In the embodiment shown in the drawings four groups 58 of three circular saws 60 each are arranged on a driving shaft 62 journalled in the two brackets 64 for the opening of the nuts. The various groups 58 of circular saws are spaced from each other by large sleeves 66 arranged on the shaft 62, and the individual circular saws 60 of each group are spaced from each other by small sleeves 68 also arranged on the shaft 62. Furthermore, on each side of the saw arrangement comprising the four groups 58 an end sleeve 70 is arranged on the shaft 62. The circular saws 60 are positively connected with the driving shaft 62 by means of nuts 72 screwed on a threaded portion of the shaft and pressed against the end sleeves 70 of the saw arrangement. The driving shaft 62 is rotated by a motor 74 mounted on the base 50 through the medium of a belt 76 trained around a pulley 78 keyed to the shaft 80 of the motor and a pulley 82 keyed to the shaft 62.

The nuts 56 are picked up from the supply table 54 by gripping means or tongs 84, one arm 83 of which is integral with a hub 85 secured to a rotatable driving shaft 86 by a screw 87 (see Fig. 9). A group of tongs 84 is associated with each group 58 of circular saws 60, and each group of tongs comprises four sets 88 of two tongs 84 each. The two tongs of each set are arranged in alignment, so that only one of the tongs of each set may be seen in Fig. 9; Fig. 8, however, illustrates the two tongs 84 of a set 88. The shaft 86 carrying the tongs 84 is journalled in a plurality of brackets 90 secured to the base 50. A cam 92 is mounted on each side of each bracket 90 opposite a group 58 of circular saws for cooperation with the free ends of the spring loaded arms 94 of the tongs 84. If, during a rotation of the shaft 86 in clockwise direction as viewed in Fig. 9, the two tongs of a set of tongs are substantially in the position of the lower left hand tongs shown in said Fig. 9, the cams 92 cooperating with the arms 94 open the two tongs against the action of their spring 96. During a further clockwise rotation of the two tongs, the latter pass in open condition through slots 98 of the supply table 54 pushing back the most advanced nut of the supply of nuts. Thereupon, during the continuation of the rotation of the two tongs, the most advanced nut returns on the inclined surface of the supply table 54 into the open mouth of said two tongs of a set. Now, the arms 94 are disengaged from the cams 92 of the tongs, and when the two tongs of a set reach the position of the upper left hand tongs in Fig. 9, the tongs are closed by the action of their springs 96 tightly clamping the nut. During a continuation of the rotation of the two tongs of a set, they pass in closed condition through the two spaces between the three circular saws 60 of a group, so that the nut held by the tongs in a position with its longitudinal axis B—B substantially parallel to the axis of said group is cut by the saws in a direction substantially perpendicular to the longitudinal axis B—B of the nut as best shown in Figs. 6 and 7. Thus, the nut is divided into two end slices 100 and two center slices 102 (see Fig. 7). According to Fig. 9 the end slices 100 cut off from the nut drop into a chute 104 leading same into a waste box 106. The center slices 102, however, are held by the two tongs 84 of a set of tongs, until, during the rotation of the tongs, the cams 92 open the tongs against the action of the springs 96. Now, when the tongs are approximately in the position of the lower right tongs shown in Fig. 9, they release the center slices dropping into the positioning chutes 108, 108', by means of which they are brought in proper position on the movable bucket conveyor generally indicated by 110 as will be described hereinafter. The distance between the axis of the shaft 86 and the axis of the shaft 62 is chosen in such a manner, that the cutting of the nut with the largest diameter to be expected is assured. The distance between the individual saws of a group 58 of circular saws is chosen in such a way, that the end slices 100 are neither too small nor too large, and that the top surfaces 112 (see Fig. 7) of the truncated conical kernel portions 114 of the center slices 102 are of sufficient size for a proper operation of the kernel expeller to be described hereinafter. The four sets 88 of tongs of the four groups of tongs are in alignment with each other, so that four nuts are cut simultaneously by the four groups 58 of saws.

The shaft 86 carrying the tongs 84 is also driven by the motor 74. For this purpose, a pulley 116 secured to the shaft 80 of the motor is connected by a belt 118 with a pulley 120 keyed to a rotatable shaft 122 bearing a worm 124 meshing with a worm gear 126 keyed to the shaft 86. Owing to the reduction gear 124, 126 the shaft 86 is rotated by the motor 74 at a lower speed than the shaft 62. For example, if each cutting operation of four nuts simultaneously presented to the four groups of saws by four aligned sets 88 of tongs requires 10 seconds, the shaft 86 driving the tongs may be rotated at a speed of 1.5 rotations per minute, while the shaft 62 driving the circular saws may be rotated at a speed of 3000 rotations per minute.

As pointed out above, the two center slices 102 of each nut are led to the conveyor 110 by a pair of positioning chutes 108, 108', one pair being associated with each group 58 of circular saws. The endless conveyor 110 comprising a plurality of carriages 128 connected with each other by links 130 carries the center slices to the expelling means 132 at the right hand end of the apparatus as viewed in Fig. 11. Said expelling means 132 is equipped with a series of three, spring loaded hammers 134, by means of which, during a downward stroke thereof, the kernel portion of the slices is disengaged from the shell portion of the slices and thrown through an opening 136 of the carriage 128 into a chute 138 leading the kernel portions to a kernel container 140 as best shown in Fig. 12. Considering now Fig. 16, it will be obvious, that the separation of the kernel portion 114 from the shell portion 142 of a center slice by a hammer expelling the kernel portion 114 through the opening 136 of the carriage 128 may be carried out only, if the small top surface 112 of the kernel portion faces the hammer. After the cutting operation, however, the nuts are held substantially in a horizontal position as shown in Fig. 7. Therefore, it is necessary to turn the two center slices of substantially the shape of a truncated cone in such a way, that they come to rest with their large base 144 on the carriages 128, so that their top surface 112 faces the hammers upon reaching same. For this purpose the positioning chutes 108 and 108' receiving the center slices 102 and leading same to the carriages of the conveyor are twisted in reversed manner with respect to each other as best shown in Fig. 17. The left hand chute 108 conveys the left hand center slice as viewed in Fig. 7 to the conveyor, and the right hand chute 108' conveys the right hand center slice. The delivery ends of the positioning chutes 108 and 108' are arranged in such a position, that the left hand center slice being further away from the expelling means is turned in the advancing direction C of the conveyor and that the left hand center slice being nearer to the expelling means is turned against the advancing direction C of the conveyor, so that the center slices drop onto the carriages 128 of the conveyor in the desired position as described above.

As best shown in Figs. 13–16, each carriage 128 of the endless bucket conveyor 110 comprises two supporting elements 146 loosely arranged on bolts 148 passing through openings of the supporting elements. Tension springs 150 stretched between the supporting elements 146 tend to bring same in contact with each other at the edges 151 of their supporting extensions or bottoms 152 as shown in Fig. 13, for example. Each bottom 152 is provided with a recess 154 so as to form above described opening 136 for the passage of the expelled kernel. The width a (see Fig. 16) of the supporting portion of the bottom 152 is substantially equal to the width of the shell of a nut. As pointed out above, the carriages 128 are connected with each other by the links 130. These links being in pivotal engagement with the bolts 148 are made of resilient material, so that they may yield to a certain degree when the supporting elements 146 of a carriage are spread apart from each other for a purpose to be described hereinafter while the supporting elements of the adjacent carriage are in contact with each other at the edges 151 of their bottoms 152 as shown in Fig. 14. The conveyor 110 passing through openings 156 of the brackets 64 is trained around the driving wheel 158 keyed to the driving shaft 160 journalled in the bracket 162 secured to the base 50 and around the idling wheel 164 arranged on the shaft 166 journalled in the bracket 168 secured to the base 50. In a manner to be described hereinafter the conveyor 110 is intermittently moved in the direction of the arrow C by means of the driving wheel 158 having notches 170 on its spokes for engagement with the bolts 148 of the conveyor.

When the carriages 128 of the conveyor 110 are in engagement with the idling wheel 164, the movable supporting elements 146 of the carriages are held in contact with each other at the edges 151 of their bottoms 152 by the springs 150 as shown in Fig. 13. In this position of the elements 146 the distance between the vertical walls of the latter is too small for the reception of a center slice delivered by the positioning chutes 108, 108'. Therefore, shortly before and during the passage of the carriages along the delivery ends of the positioning chutes, the supporting elements 146 are spread apart from each other by spreading means generally indicated by 172 in Figs. 11 and 15. Said spreading means comprise a member 174 mounted on the base 50 and provided with a plurality of pairs of spreading rollers 176 rotatably arranged on vertical bolts 178. The rollers of each pair are arranged at such a distance from each other, that, upon engagement with the supporting elements 146, the latter are spread apart from each other to such an extent, that the distance between the vertical walls of the supporting elements becomes larger than the diameter of the shell of the nuts, as best shown in Figs. 14 and 15. Thus, each carriage 128 may readily receive a center slice from a positioning chute, when it passes along such a chute.

As soon as the carriages 128 are disengaged from the spreading means 172 during their advancement in the direction of the arrow C (Fig. 11), the springs 150 urge the supporting elements 146 toward each other, whereby the center slice received by a carriage is tightly clamped by the supporting elements 146 as shown in Fig. 16. In this condition the center slices are presented to the hammers 134 of the expeller 132 by the carriages. After the expelling of the kernel portion from the shell of the nut, the spring loaded supporting elements 146 of the carriages tightly hold the empty shell, until they are again spread apart from each other by second spreading means 180 similar to the first spreading means 172, whereby the empty shells are released for discharge into the container 182. After disengagement of the supporting elements 146 from the second spreading means 180, the elements 146 are again in close contact with each other at the edges 151 of the bottoms 152 by the springs 150 as described above.

As will be apparent from above, the resilient clamping means 146, 150 of the carriages 128 of the conveyor 110 automatically adjust themselves to the size of the nuts, so that a previous assortment of the nuts according to their size is unnecessary.

As pointed out above, the expelling means 132 comprises the three hammers 134. These hammers are slidably arranged in bores 184 of a lever 186 swingably arranged on a shaft 188 carried by brackets 190 secured to the base 50. Each hammer is equipped with a head 192 normally resting on the upper surface of the lever 186 under the action of a spring 194. The lever 186 carrying the spring loaded hammers 134 is oscillated by means of a connecting rod 196 having one of its ends linked to a pin 198 projecting from the lever 186 and having its other end linked to a pin 200 projecting from a disc 202 keyed to the shaft 80 of the motor 74. If, during a downward stroke of the expelling means 132, a hammer 134 properly hits the kernel portion of a center slice 102 held by a carriage 128 of the conveyor, the kernal portion will be expelled by the action of the hammer 134, as the force of the spring 194 pressing the head 192 of the hammer 134 against the lever 186 is greater than the force required for the disengagement of the kernel from the shell; if, however, during a downward stroke, a hammer 134 hits the shell portion of the center slice held by a carriage of the conveyor, the hammer slidably arranged in the bore 184 will yield against the action of the spring 194.

For the sake of a smooth operation of the expelling means, the conveyor 110 should be advanced intermittently in timed relationship to the operation of the expelling means so as to avoid an advancement of the conveyor during the expelling proper of the kernel portion by the hammer contacting the kernel and penetrating into the center slice. Therefore, the drive of the conveyor is controlled by the continuously oscillating lever 186 of the expelling means 132 in the following manner: The lever 186 has an extension 204 provided with an opening 206 for the passage of a controlling rod 208 having a head 210 normally resting on the upper surface of the extension 204. The lower end of the controlling rod 208 is pivoted at 212 to an arm 214 loosely arranged on the shaft 160 carrying the driving wheel 158 keyed thereto. A spring loaded pawl 216 in engagement with a ratchet wheel 218 keyed to the shaft 160 is pivotally mounted on the arm 214 at 220. The free end of the arm 214 may abut against a shoulder 222 on the base 50 as best shown in Fig. 11. The arrangement of the shoulder 222 is in such a relationship to the extension 204 cooperating with the head 210 of the controlling rod 208, that, during a downward stroke of the lever 186, the arm 214 comes to a rest on the shoulder 222 shortly before the hammers 134 reach the center slices held by the carriages of the conveyor as shown in Fig. 11. During the further downward movement of the lever 186 into the position 186' shown in Fig. 11a for an expelling of a kernel portion, the arm 214 rests on the shoulder 222, so that the head 210 of the controlling rod 208 is disengaged from the extension 204. The arm 214 remains in contact with the shoulder 222, until, during the subsequent upward movement of the lever 186, the lever 186 reaches again the position shown in Fig. 11. Thereupon, during the continuation of the upward movement of the lever 186 into the position 186'' shown in Fig. 11b, the controlling rod 208 is lifted by the extension 204 engaged with the head, whereby the arm 214 is rocked in clockwise direction as viewed in Fig. 11 for an advancing of the conveyor 110 through a predetermined distance by means of the ratchet wheel drive 216, 218 and the driving wheel 158. During the subsequent downward movement of the lever 186 from the position 186'' shown in Fig. 11b into the position shown in Fig. 11, the pawl 216 slides along the circumference of the ratchet wheel 218 without rotating same. Thus, the conveyor 110 is intermittently advanced in timed relationship to the operation of the expelling means in such a way that the conveyor remains at a standstill shortly before and during the penetration of a hammer into a center slice.

As best shown in Figs. 8 and 12, the three hammers 134 are arranged adjacent each other in a row, which is at an angle to the row of carriages 128 of the conveyor 110. Owing to this arrangement of the hammers 134 relative to the conveyor and owing to the intermittent advancement of the conveyor as described above, the entire area of a center slice is subjected to the action of the expelling means irrespective of the shape of the slice and the shape of the kernel portion of said slice.

As pointed out above, four nuts are cut simultaneously by the four groups 58 of circular saws 60, and each carriage 128 may receive one center slice. Therefore, the drive for the conveyor 110 must be adjusted in such a way, that, during the cutting operation of said four nuts, the conveyor is advanced step by step through at least such a distance, that all of the eight center slices delivered by the positioning chutes onto the conveyor at the end of the previous cutting operation are brought to the expelling means, so that at the end of the new cutting operation the new center slices may be delivered to the carriages of the conveyor. In other words, if $n$ represents the number of nuts cut at the same time, the number of center slices produced by each cutting operation amounts to $2n$, and, as each carriage of the conveyor carries at the most only one center slice, the conveyor must be advanced through a distance $d$ of at least $2n$ carriages during each cutting operation. Furthermore, if $c$ represents the length of each carriage and if $s$ represents the number of strokes of the lever 186 during each cutting operation, the advance $t$ of the conveyor per stroke of the lever 186 equals to $$\frac{2n \cdot c}{s}$$

The operation of the apparatus shown in the drawings is as follows:

The shaft 62 carrying the groups 58 of circular saws 60, the shaft 86 carrying the tongs 84, and the oscillating lever 186 of the expelling means 132 are driven continuously by the motor 74. The conveyor 110 is advanced step by step by the ratchet wheel drive 158, 214, 216, 218 controlled by the oscillating lever 186 through the medium of the rod 208.

The nuts 56 to be opened are brought in any suitable manner onto the supply table 54. Four nuts are picked up simultaneously by four sets 88 of tongs. The nuts gripped by the tongs are presented to four groups 58 of circular saws 60 for a simultaneous cutting of the nuts. After the performance of the cutting operation, the two end slices of each nut drop into the waste box 106, while the two center slices 102 of each nut are placed in proper position onto the conveyor 110 by the positioning chutes 108, 108'. Each carriage 128 of the conveyor receives at the most only one center slice. The center slices 102 held by the clamping elements 146, 150 of the carriages are brought to the expelling means 132, by means of which the kernel portions 114 of the center slices are expelled. The kernel portions thus extracted from the nuts are discharged into the container 140, while the empty shell portions of the center slices are automatically delivered into the container 182.

I have described preferred embodiments of my invention, but it is clear that numerous changes and omissions may be made without departing from the spirit of my invention. For example, instead of four sets of tongs any other number of sets of tongs could be associated with each group of circular saws. Furthermore, any other number of groups of circular saws instead of four may be arranged in the apparatus. Moreover, under certain circumstances each group of circular saws may consist of more or less than three saws. Furthermore, the bucket conveyor, its drive, its carriages and its clamping means may be constructed in a different manner. Or, the expelling means shown in the drawings may be replaced by an expelling means having more than three spring loaded hammers or by another separating means of a different construction, if desired.

What I claim is:

1. In an apparatus for the extraction of the kernel or kernels from a nut, the combination of: means for cutting the nuts clear through the kernel or kernels in a direction substantially perpendicular to their longitudinal axis so as to divide each nut into a plurality of slices consisting of two end slices and at least one center slice substantially in the shape of a truncated cone, expelling means for expelling the kernel portion from the shell portion of a slice, means for conveying the center slices delivered by said cutting means to said expelling means, and driving means for an automatic operation of said cutting means and said expelling means.

2. In an apparatus for the extraction of the kernel or kernels from a nut, the combination of: means for cutting the nuts in a direction substantially perpendicular to their longitudinal axis so as to divide each nut into a plurality of slices consisting of two end slices and at least one center slice substantially in the shape of a truncated cone, a spring loaded hammer for expelling the kernel portion from the shell portion of a slice, means for conveying the center slices delivered by said cutting means to said spring loaded hammer, and driving means for an automatic operation of said cutting means and said spring loaded hammer.

3. In an apparatus for the extraction of the kernel or kernels from a nut, the combination of: means for cutting the nuts clear through the kernel or kernels in a direction substantially perpendicular to their longitudinal axis so as to divide each nut into a plurality of slices consisting of two end slices and at least one center slice substantially in the shape of a truncated cone, expelling means for expelling the kernel portion from the shell portion of a slice, means for conveying the center slices delivered by said cutting means to said expelling means, positioning means for placing said center slices onto said conveying means in such a position that the small surface of each center slice faces the expelling means upon reaching same, and driving means for an automatic operation of said cutting means and said expelling means.

4. In an apparatus for the extraction of the kernel or kernels from a nut, the combination of: at least one group of three spaced circular saws, feeding means associated with each group of circular saws for presenting the nuts to the group of circular saws with the longitudinal axis of the nuts substantially parallel to the axis of the group of circular saws whereby each nut is divided by the circular saws into a plurality of slices consisting of two end slices and two center slices substantially in the shape of a truncated cone, expelling means for expelling the kernel portion from the shell portion of a slice, means for conveying the center slices delivered by the saws to said expelling means, a first positioning chute associated with each of said groups of circular saws for receiving one of said two center slices delivered by each group of saws, a second positioning chute associated with each of said groups of circular saws for receiving the other center slice delivered by each group of saws, said two positioning chutes being of such a shape and having their delivery ends in such a position so as to place each center slice of substantially truncated conical shape with its base onto said conveying means so that the top surface of each center slice faces the expelling means upon reaching same, and driving means for an automatic operation of said groups of circular saws and said expelling means.

5. In an apparatus for the extraction of the kernel or kernels from a nut, the combination of: means for cutting the nuts clear through the kernel or kernels in a direction substantially perpendicular to their longitudinal axis so as to divide each nut into a plurality of slices consisting of two end slices and at least one center slice substantially in the shape of a truncated cone, expelling means for expelling the kernel portion from the shell portion of a slice, a movable conveyor for carrying the center slices delivered by said cutting means to said expelling means, and driving means for an automatic operation of said cutting means, said conveyor and said expelling means.

6. In an apparatus for the extraction of the kernel or kernels from a nut, the combination of: means for cutting the nuts in a direction substantially perpendicular to their longitudinal axis so as to divide each nut into a plurality of slices consisting of two end slices and at least one center slice substantially in the shape of a truncated cone, expelling means including a plurality of spring loaded hammers for expelling the kernel portion from the shell portion of a slice, an endless bucket conveyor including a plurality of carriages movably connected with each other, said bucket conveyor being arranged for carrying the center slices delivered by said cutting means to said expelling means and for cooperation with said spring loaded hammers of said expelling means, said spring loaded hammers being arranged adjacent to each other in a row at an angle to the row of carriages of the bucket conveyor cooperating with said hammers, and driving means for an automatic operation of said cutting means, said bucket conveyor and said expelling means.

7. In an apparatus for the extraction of the kernel or kernels from a nut, the combination of: means for cutting the nuts clear through the kernel or kernels in a direction substantially perpendicular to their longitudinal axis so as to divide each nut into a plurality of slices consisting of two end slices and at least one center slice substantially in the shape of a truncated cone, expelling means for expelling the kernel portion from the shell portion of a slice, an endless bucket conveyor including a plurality of carriages movably connected with each other, said bucket conveyor being arranged for carrying the center slices delivered by said cutting means to said expelling means and for cooperation with said expelling means, clamping means arranged on the carriages of the bucket conveyor, controlling means arranged for cooperation with said clamping means for a timed opening and closing thereof so as to receive the center slices, to hold same for presenting same to the expelling means and to release the shell portion of the slices after the expelling of the kernel portion by the expelling means, and driving means for an automatic operation of said cutting means, said bucket conveyor and said expelling means.

8. In an apparatus for the extraction of the kernel or kernels from a nut, the combination of: means for cutting the nuts clear through the kernel or kernels in a direction substantially perpendicular to their longitudinal axis so as to divide each nut into a plurality of slices consisting of two end slices and at least one center slice substantially in the shape of a truncated cone, expelling means for expelling the kernel portion from the shell portion of a slice, an endless bucket conveyor including a plurality of carriages movably connected with each other, said bucket conveyor being arranged for carrying the center slices delivered by said cutting means to said expelling means and for cooperation with said expelling means, each carriage of said bucket conveyor comprising two supporting elements movably arranged with respect to each other, spring means associated with said supporting elements for urging same toward each other, controlling means arranged for cooperation with said spring loaded supporting elements for a timed spreading apart from each other and releasing of said supporting elements so as to receive the center slices, to hold same for presenting same to the expelling means and to release the shell portion of the slices after the expelling of the kernel portion by the expelling means, and driving means for an automatic operation of said cutting means, said bucket conveyor and said expelling means.

9. In an apparatus for the extraction of the kernel or kernels from a nut, the combination of: means for cutting the nuts in a direction substantially perpendicular to their longitudinal axis so as to divide each nut into a plurality of slices consisting of two end slices and at least one center slice substantially in the shape of a truncated cone, expelling means for expelling the kernel portion from the shell portion of a slice, a movable conveyor for carrying the center slices delivered by said cutting means to said expelling means, positioning means for placing said center slices of substantially truncated conical shape with their bases onto said movable conveyor so that the top surface of each center slice faces the expelling means upon reaching same, and driving means for an automatic operation of said cutting means, movable conveyor and expelling means.

10. In an apparatus for the extraction of the kernel or kernels from a nut, the combination of: at least one group of spaced circular saws, feeding means associated with each group of circular saws for presenting the nuts to the group of circular saws with the longitudinal axis of the nuts substantially parallel to the axis of the group of circular saws whereby each nut is divided by the circular saws into a plurality of slices consisting of two end slices and at least one center slice substantially in the shape of a truncated cone, expelling means for expelling the kernel portion from the shell portion of a slice, a movable conveyor for conveying the center slices delivered by said saws to said expelling means, positioning means for placing said center slices of substantially truncated conical shape with their bases onto said movable conveyor so that the top surface of each center slice faces the expelling means upon reaching same, and driving means for an automatic operation of said groups of circular saws, movable conveyor and expelling means.

11. In an apparatus for the extraction of the kernel or kernels from a nut, the combination of: at least one group of three spaced circular saws, feeding means associated with each group of circular saws for presenting the nuts to the group of circular saws with the longitudinal axis of the nuts substantially parallel to the axis of the group of circular saws whereby each nut is divided by the circular saws into a plurality of slices consisting of two end slices and two center slices substantially in the shape of a truncated cone, expelling means for expelling the kernel portion from the shell portion of a slice, a movable conveyor for carrying the center slices delivered by said saws to said expelling means, a first positioning chute associated with each of said groups of circular saws for receiving one of said two center slices delivered by each group of saws, a second positioning chute associated with each of said groups of circular saws for receiving the other center slice delivered by each group of saws, said two positioning chutes being of such a shape and having their delivery ends in such a position so as to place each center slice of substantially truncated conical shape with its base onto said movable conveyor so that the top surface of each center slice faces the expelling means upon reaching same, and driving means for an automatic operation of said groups of circular saws, movable conveyor and expelling means.

12. In combination with the elements of an apparatus as claimed in claim 10, an endless bucket conveyor including a plurality of carriages movably connected with each other, said bucket conveyor being arranged for carrying the center slices delivered by said saws to said expelling means and for cooperation with said expelling means, clamping means arranged on the carriages of the bucket conveyor and controlling means arranged for cooperation with said clamping means for a timed opening and closing thereof so as to receive the center slices, to hold same for presenting same to the expelling means and to release the shell portion of the slices after the expelling of the kernel portion by the expelling means.

13. In an apparatus for the extraction of the kernel or kernels from a nut, the combination of: means for cutting the nuts clear through the kernel or kernels in a direction substantially perpendicular to their longitudinal axis so as to divide each nut into a plurality of slices consisting of two end slices and at least one center slice substantially in the shape of a truncated cone, expelling means for expelling the kernel portion from the shell portion of a slice, a movable conveyor for carrying the center slices delivered by said cutting means to said expelling means, driving means for a continuous operation of said cutting means and said expelling means, and a driving mechanism for an intermittent advancing of said conveyor in timed relationship to the operation of said expelling means.

14. An apparatus as claimed in claim 13 including controlling means associated with said expelling means for controlling the driving mechanism for an intermittent advancing of the conveyor.

15. In an apparatus for the extraction of the kernel or kernels from a nut, the combination of at least one group of spaced circular saws, gripping means associated with each group of circular saws for receiving the nuts from a supply and presenting the nuts to the group of circular saws with the longitudinal axis of the nuts substantially parallel to the axis of the group of circular saws whereby each nut is cut clear through the kernel or kernels and is divided by the circular saws into a plurality of slices consisting of two end slices and at least one center slice substantially in the shape of a truncated cone, expelling means for expelling the kernel portion from the shell portion of a slice, a movable conveyor for carrying the center slices delivered by said cutting means to said expelling means, driving means for a continuous operation of said gripping means, said groups of circular saws and said expelling means, and a driving mechanism for an intermittent advancing of said conveyor in timed relationship to the operation of said expelling means.

16. In an apparatus for the extraction of the kernel or kernels from a nut, the combination of: a series of cutting means for cutting the nuts in a direction substantially perpendicular to their longitudinal axis so as to divide each nut into a plurality of slices consisting of two end slices and at least one center slice substantially in the shape of a truncated cone, said cutting means being arranged in a row for a substantially simultaneous cutting of a number of nuts equal to the number of cutting means, expelling means for expelling the kernel portion from the shell portion of a slice, a movable conveyor arranged for receiving the center slices from said cutting means and for carrying said center slices to said expelling means, and driving means for an automatic operation of said cutting means, said conveyor and said expelling means, said driving means including a mechanism for advancing the conveyor during a cutting operation of the cutting means through a distance at least equal to the distance between the first and last cutting means of said series of cutting means.

17. In an apparatus for the extraction of the kernel or kernels from a nut, the combination of: a series of groups of spaced circular saws, gripping means associated with each group of circular saws for receiving the nuts from a supply and presenting the nuts substantially simultaneously to the series of groups of circular saws with the longitudinal axis of the nuts substantially parallel to the axes of the groups of circular saws whereby a number of nuts equal to the number of groups of circular saws is divided simultaneously and whereby each nut is divided by the circular saws into a plurality of slices consisting of two end slices and at least one center slice the sectional planes of which include a shell portion and a substantial kernel portion, expelling means for expelling the kernel portion from the shell portion of a slice, a movable conveyor arranged for receiving the center slices from said groups of circular saws and for carrying said center slices to said expelling means, and driving means for an automatic operation of said groups of circular saws, said conveyor and said expelling means, said driving means including a mechanism for advancing the conveyor during a cutting operation of the series of groups of circular saws step by step in timed relationship to the operation of the expelling means through a distance at least equal to the distance between the first circular saw of the first group of circular saws and the last circular saw of the last group of circular saws.

18. An apparatus for the extraction of the kernel portion from the shell portion of slices of nuts being substantially in the shape of truncated cones, comprising: expelling means for expelling the kernel portion from the shell portion of a slice, means for conveying the slices to said expelling means, and a positioning chute for receiving the slices, said positioning chute being of such a shape and having its delivery end in such a position so as to place said slices of substantially truncated conical shape with their bases onto said conveying means so that the top surface of the slices faces the expelling means upon reaching same.

19. An apparatus for the extraction of the kernel portion from the shell portion of slices of nuts being substantially in the shape of truncated cones, comprising: a spring loaded hammer for expelling the kernel portion from the shell portion of a slice, means for conveying the slices to said spring loaded hammer, a positioning chute for receiving the slices, said positioning chute being of such a shape and having its delivery end in such a position so as to place said slices of substantially truncated conical shape with their bases onto said conveying means so that the top surface of the slices faces the spring loaded hammer upon reaching same, and driving means for an automatic operation of said spring loaded hammer.

20. An apparatus for the extraction of the kernel portion from the shell portion of slices of nuts being substantially in the shape of truncated cones, comprising: a plurality of spring loaded hammers for expelling the kernel portion from the shell portion of a slice, an endless bucket conveyor including a plurality of carriages movably connected with each other, said bucket conveyor being arranged for carrying the slices to said spring loaded hammers, said spring loaded hammers being arranged adjacent to each other in a row at an angle to the row of carriages of the bucket conveyor, positioning means for receiving said slices of substantially truncated conical shape and for automatically placing same with their bases onto said bucket conveyor so that the top surface of the slices faces the expelling means upon reaching same, and driving means for an automatic operation of said spring loaded hammers and said bucket conveyor.

21. An apparatus for the extraction of the kernel portion from the shell portion of slices of nuts being substantially in the shape of truncated cones, comprising: expelling means for expelling the kernel portion from the shell portion of a slice, a movable conveyor for carrying the slices to said expelling means, a positioning chute for receiving the slices, said positioning chute being of such a shape and having its delivery end in such a position so as to place said slices of substantially truncated conical shape with their bases onto said conveyor so that the top surface of the slices faces the expelling means upon reaching same, driving means for an actuation of said expelling means, a driving mechanism actuated by said expelling means and connected with said conveyor for driving same, and means associated with said driving mechanism for causing an intermittent advancing of said conveyor in timed relationship to the operation of said expelling means.

22. An apparatus for the extraction of the kernel portion from the shell portion of slices of nuts being substantially in the shape of truncated cones, comprising: a plurality of spring loaded hammers for expelling the kernel portion from the shell portion of a slice, a movable conveyor for carrying the slices to said expelling means, said spring loaded hammers being arranged adjacent to each other in a row at an angle to the longitudinal axis of the conveyor, positioning means for receiving said slices of substantially truncated conical shape and for automatically placing same with their bases onto said conveyor so that the top surface of the slices faces the expelling means upon reaching same, driving means for an actuation of said spring loaded hammers, and a driving mechanism for an intermittent advancing of said conveyor in timed relationship to the operation of said spring loaded hammers.

23. An apparatus for the extraction of the kernel portion from the shell portion of slices of nuts being substantially in the shape of truncated cones, comprising: a plurality of spring loaded hammers for expelling the kernel portion from the shell portion of a slice, an endless bucket conveyor including a plurality of carriages movably connected with each other, said bucket conveyor being arranged for carrying the slices to said spring loaded hammers, said spring loaded hammers being arranged adjacent to each other in a row at an angle to the row carriages of the bucket conveyor, clamping means arranged on the carriages of the bucket conveyor, controlling means arranged for cooperation with said clamping means for a timed opening and closing thereof so as to receive the slices, to hold same for presenting same to said spring loaded hammers and to release the shell portion of the slices after the expelling of the kernel portion by the spring loaded hammers, positioning means for receiving said slices of substantially truncated conical shape and for automatically placing same with their bases onto said conveyor so that the top surface of the slices faces the spring loaded hammers upon reaching same, driving means for a continuous operation of said spring loaded hammers, and a driving mechanism for an intermittent advancing of said conveyor in timed relationship to the operation of said spring loaded hammers.

FRITZ ALBERT DEUTSCH.

REFERENCES CITED

The following references are of record in the file of this patent:

UNITED STATES PATENTS

| Number | Name | Date |
|---|---|---|
| 826,785 | Hormby | July 24, 1906 |
| 1,553,227 | Feyk et al. | Sept. 8, 1925 |
| 1,802,294 | Walker | Apr. 21, 1931 |
| 667,423 | Brown | Feb. 5, 1901 |
| 2,271,675 | Ashlock, Jr. | Feb. 3, 1942 |
| 1,645,600 | Kobler | Oct. 18, 1927 |